(12) United States Patent
Kalbasi

(10) Patent No.: US 12,457,020 B2
(45) Date of Patent: Oct. 28, 2025

(54) INTELLIGENT DOWNLINK BEAMFORMING IN A WIRELESS COMMUNICATION NETWORK

(71) Applicant: Parsa Wireless Communications LLC, Stamford, CT (US)

(72) Inventor: Reza Kalbasi, San Diego, CA (US)

( * ) Notice: Subject to any disclaimer, the term of this patent is extended or adjusted under 35 U.S.C. 154(b) by 100 days.

(21) Appl. No.: 18/370,294

(22) Filed: Sep. 19, 2023

(65) Prior Publication Data

US 2024/0097761 A1 Mar. 21, 2024

Related U.S. Application Data

(60) Provisional application No. 63/407,792, filed on Sep. 19, 2022.

(51) Int. Cl.
*H04L 5/12* (2006.01)
*H04B 7/06* (2006.01)
*H04W 72/1273* (2023.01)

(52) U.S. Cl.
CPC ....... *H04B 7/0617* (2013.01); *H04B 7/06958* (2023.05); *H04W 72/1273* (2013.01)

(58) Field of Classification Search
CPC ............. H04B 7/0617; H04B 7/06958; H04W 72/1273
USPC ................ 375/262, 260, 259, 219, 295, 316
See application file for complete search history.

(56) References Cited

U.S. PATENT DOCUMENTS

| | | | |
|---|---|---|---|
| 2014/0307654 A1* | 10/2014 | Kim | H04B 7/0617 370/329 |
| 2018/0131434 A1* | 5/2018 | Islam | H04B 7/0408 |
| 2023/0291458 A1* | 9/2023 | Yang | H04B 7/06952 |

* cited by examiner

*Primary Examiner* — Zewdu A Kassa
(74) *Attorney, Agent, or Firm* — John F. Vodopia

(57) ABSTRACT

A method of data transmission includes steps of receiving, by a base station (BS), from a user equipment (UE), a first set of training signals, using the first set of training signals to determine a first downlink (DL) beam for DL data transmission, transmitting data on the first DL beam to the UE, receiving, by the UE, a second set of training signals, using the first uplink beam and the second set of training signals to determine a second DL beam for the uplink data transmission and transmitting data on the second DL beam to the UE.

18 Claims, 17 Drawing Sheets

| Transport channel<br>Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel<br>Logical channel | UL-SCH | RACH |
|---|---|---|
| CCCH | X | |
| DCCH | X | |
| DTCH | X | |

FIG. 3B

| Physical channel / Transport channel | PDSCH | PDCCH | PBCH |
|---|---|---|---|
| BCH | | | X |
| PCH | X | | |
| DL-SCH | X | | |

FIG. 4A

| Physical channel / Transport channel | PUSCH | PUCCH | PRACH |
|---|---|---|---|
| UL-SCH | X | | |
| RACH | | | X |

FIG. 4B

| Physical Signal | DM-RS | PT-RS | PRS | CSI-RS | PSS | SSS | SRS |
|---|---|---|---|---|---|---|---|
| DL | X | X | X | X | X | X | |
| UL | X | X | | | | | X |

INTELLIGENT DOWNLINK BEAMFORMING IN A WIRELESS COMMUNICATION NETWORK

CROSS-REFERENCE TO RELATED APPLICATION

This application claims priority under 35 USC § 119(e) from U.S. Provisional Patent Application No. 63/407,792, filed on Sep. 19, 2022 ("the provisional application"); the content of the provisional patent application is incorporated herein by reference.

BACKGROUND OF THE INVENTION

The present invention is directed to 5G, which is the $5^{th}$ generation mobile network. It is a new global wireless standard after 1G, 2G, 3G, and 4G networks. 5G enables networks designed to connect machines, objects and devices.

The invention is more specifically directed to apparatus and methods for intelligent Downlink (DL) beamforming at a Base Station (BS) in a wireless network, where a user equipment (UE) transmits a first set of training signals to a base station (BS), which uses a first set of the training signals to predict a DL beam for DL transmission of data and then transmits data on its DL beam, measures the received DL beam parameters and transmits a report to the UE, which then transmits a second set of the training signals to the BS from which the BS predicts its future DL beams.

SUMMARY OF THE INVENTION

In an embodiment, the invention provides a method of data transmission includes receiving, by a base station (BS), from a user equipment (UE), a first set of training signals, using the first set of training signals to determine a first downlink (DL) beam for DL data transmission, transmitting data on the first DL beam to the UE, receiving, by the UE, a second set of training signals, using the first uplink beam and the second set of training signals to determine a second DL beam for the uplink data transmission and transmitting data on the second DL beam to the UE. The method can include receiving a beam report from the user equipment (UE) and/or include transmitting downlink (DL) training signals in a plurality of DL beams, wherein each DL beam has a different direction and/or receiving a beam report from the user equipment (UE), wherein the beam report indicates the strongest downlink (DL) beam.

The beam report can include a layer 1 of the reference signal received power (L1-RSRP) of a beam in the plurality of downlink (DL) beams that has the strongest L1-RSRP. The beam report can include one or more of the following: a direction of arrival (DOA) of the first downlink (DL) beam or the second DL beam; a direction of departure (DOD) of the first DL beam or the second DL beam; a phase of the first DL beam or the second DL beam; and an amplitude of the first DL beam or the second DL beam. The first downlink (DL) beam or the second DL beam may be determined based on an artificial intelligence (AI) model and the first set of training signals, and the second set of training signals can be used to train the AI model such that the AI model predicts a direction of the first DL beam or the second DL beam.

In the method, the determining the first downlink (DL) beam can include computing parameters of the first uplink beam that maximize signal-to-interference-plus-noise ratio (SINR) of the first DL beam at the UE and determining the second DL beam can include computing parameters of the second DL beam that maximize signal-to-interference-plus-noise ratio (SINR) of the second DL beam at the base station (BS). The parameters of the first downlink (DL) beam and the parameters of the second DL beam can include one or more of the following: a direction of arrival (DOA); a direction of departure (DOD); a beam phase; and a beam amplitude. The first set of training signals and the second set of training signals can include one or more of the following: a transmit power control (TPC) signal; an automatic repeat request (ARQ) signal; a phase information signal; and an amplitude information signal. The method can include transmitting downlink (DL) training signals in a subset of the plurality of DL beams.

In an embodiment, the invention provides a method of beam recovery that includes transmitting, by a user equipment (UE), to a base station (BS), a first set of training signals, receiving, from the BS, data on a first downlink (DL) beam, transmitting, to the BS, a first beam report, transmitting, by the user equipment (UE), to the BS, a second set of training signals, receiving, from the BS, data on a second DL beam, and transmitting, to the BS, a second beam report.

In another embodiment, the invention provides a method of beam recovery that includes transmitting, to a user equipment (UE), data in a first beam, receiving a report, from the UE, including information which includes the first beam measurements, and successful reception or failure of the first beam, in response to receiving the report, determining a second beam based on the first beam and information included in the report and transmitting, to the UE, data in a second beam. The second beam may be determined based on the information included in the report by an artificial intelligence (AI) model. The successful reception or failure of the first beam may be used to train the artificial intelligence (AI) model. The beam recovery process may be used when the user equipment (UE) is in an idle mode. The beam recovery process may be used when the user equipment (UE) is in a connected mode.

The method may include measuring the received signal, from the user equipment (UE), at the base station (BS), determining the quality of the channel between the UE and the BS, based on the measurement of the received signal and whether the channel quality is below a threshold, determine the second beam, and switch the data transmission from the first beam to the second beam. The method may include an artificial intelligence (AI) model wherein: the AI model actively determines the second beam, whether the report indicates successful reception or failure of the first beam.

In an embodiment, the invention provides a base station (BS) that includes a transceiver configured to: transmit, to a user equipment (UE), a first set of training signals; transmit data on a first beam to the UE; receive, from the UE, a second set of training signals; and transmit data on a second beam to the UE; and a processor in communication with transceiver, the processor configured to: use the first set of training signals to determine the first beam for downlink (DL) data transmission; and use the first DL beam and the second set of training signals to determine a second DL beam for the DL data transmission.

BRIEF DESCRIPTION OF THE DRAWINGS

FIG. 3A and FIG. 3B show example mappings between logical channels and transport channels in downlink and uplink respectively, according to some aspects of some of various exemplary embodiments of the present disclosure.

FIG. 4A and FIG. 4B show example mappings between transport channels and physical channels in downlink and uplink respectively, according to some aspects of some of various exemplary embodiments of the present disclosure.

DETAILED DESCRIPTION

Figure 1:
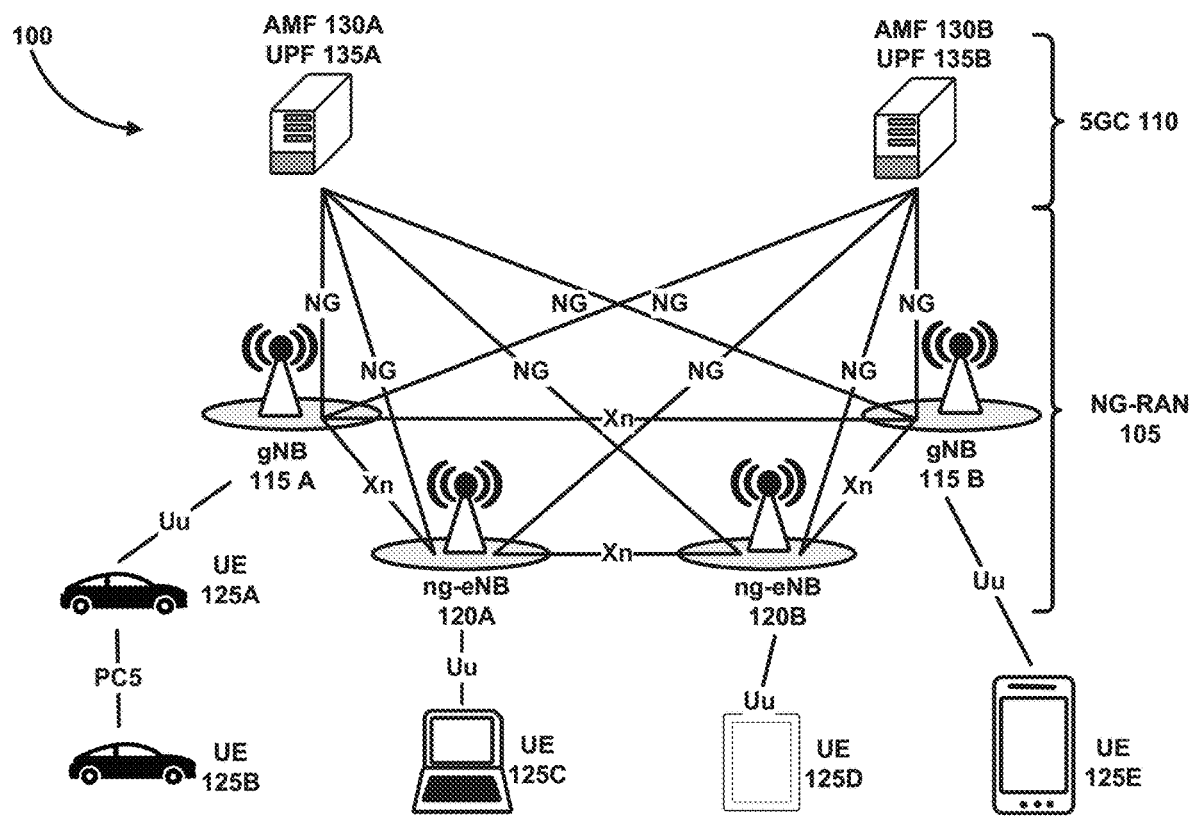
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
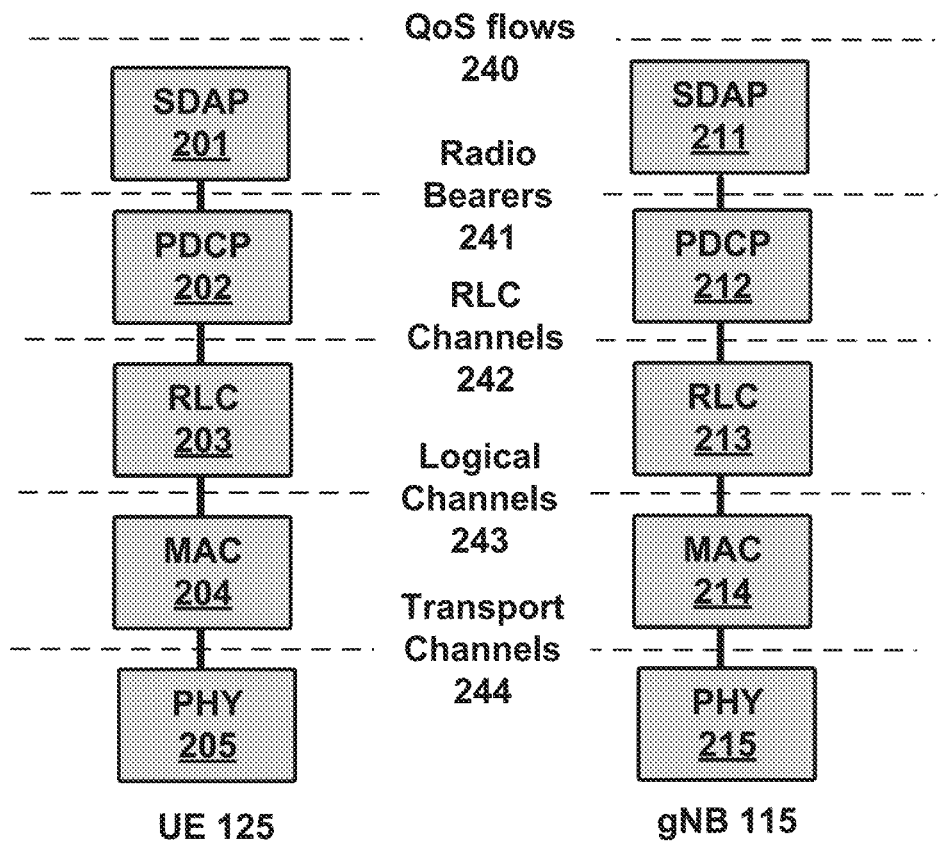
FIG. 2A and FIG. 2B show examples of radio protocol stacks for user plane and control plane, respectively, according to some aspects of some of various exemplary embodiments of the present disclosure.
Figure 2B:
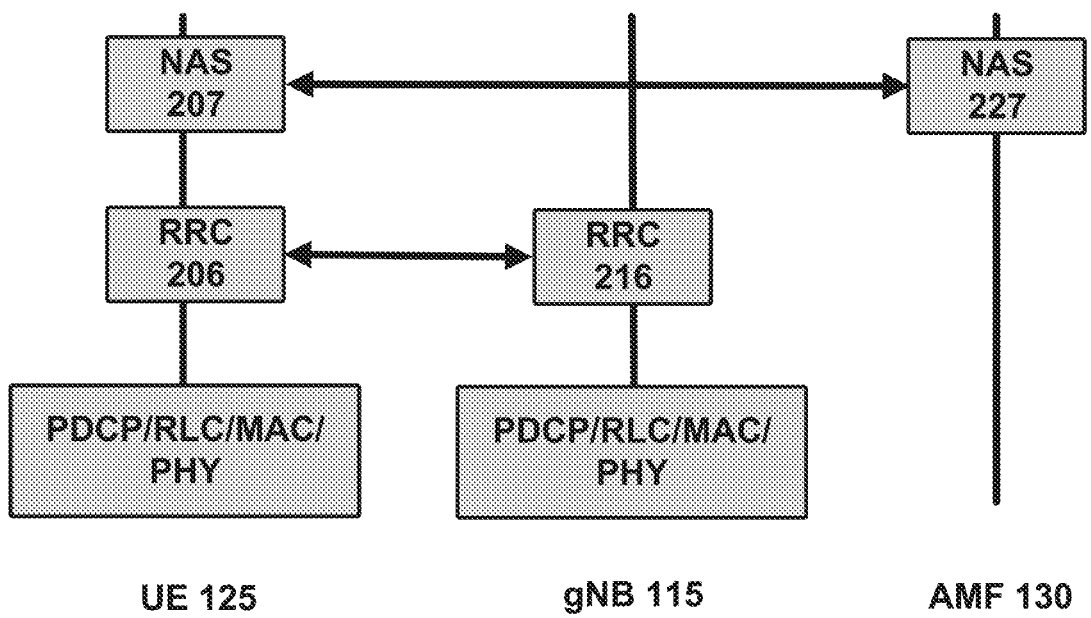

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

FIG. 3A, FIG. 3B show example mappings between logical channels and transport channels in downlink and uplink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink.

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

FIG. 4A, FIG. 4B show example mappings between transport channels and physical channels in downlink, and uplink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

Figure 5:
FIG. 5 shows example physical signals in downlink and uplink according to some aspects of some of various exemplary embodiments of the present disclosure.

FIG. 5 shows example physical signals in downlink, and uplink according to some aspects of some of various exemplary embodiments of the present disclosure. The Demodulation Reference Signal (DM-RS) may be used in downlink and uplink, and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink and uplink, and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink. CSI-RS may be used for channel state estimation, Reference Signal Received Power (RSRP) measurement for mobility and beam management, time/frequency tracking for demodulation among other uses. CSI-RS may be configured for a UE-specifically but multiple users may share the same CSI-RS resource. The UE may determine CSI reports and transit them in the uplink to the base station using PUCCH or PUSCH. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS.

Figure 6:
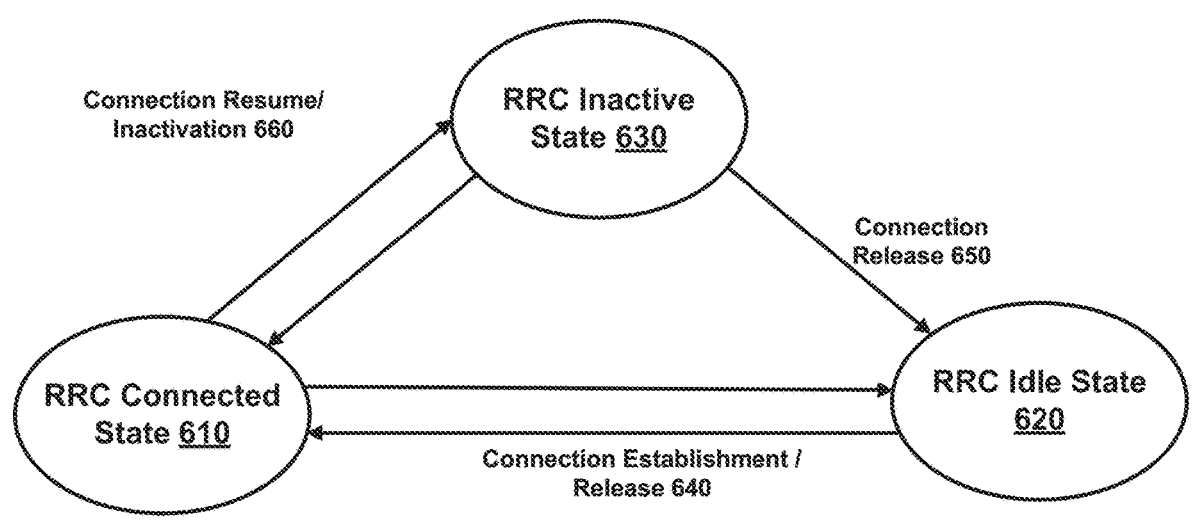
FIG. 6 shows examples of Radio Resource Control (RRC) states and transitioning between different RRC states according to some aspects of some of various exemplary embodiments of the present disclosure.

FIG. 6 shows examples of Radio Resource Control (RRC) states and transitioning between different RRC states according to some aspects of some of various exemplary embodiments of the present disclosure. A UE may be in one of three RRC states: RRC Connected State 610, RRC Idle State 620 and RRC Inactive state 630. After power up, the UE may be in RRC Idle state 620 and the UE may establish connection with the network using initial access and via an RRC connection establishment procedure to perform data transfer and/or to make/receive voice calls. Once RRC connection is established, the UE may be in RRC Connected State 610. The UE may transition from the RRC Idle state 620 to the RRC connected state 710 or from the RRC Connected State 610 to the RRC Idle state 620 using the RRC connection Establishment/Release procedures 640.

To reduce the signaling load and the latency resulting from frequent transitioning from the RRC Connected State 610 to the RRC Idle State 620 when the UE transmits frequent small data, the RRC Inactive State 630 may be used. In the RRC Inactive State 630, the AS context may be stored by both UE and gNB. This may result in faster state transition from the RRC Inactive State 630 to RRC Connected State 610. The UE may transition from the RRC Inactive State 630 to the RRC Connected State 610 or from the RRC Connected State 610 to the RRC Inactive State 630 using the RRC Connection Resume/Inactivation procedures 660. The UE may transition from the RRC Inactive State 630 to RRC Idle State 620 using an RRC Connection Release procedure 650.

Figure 7:
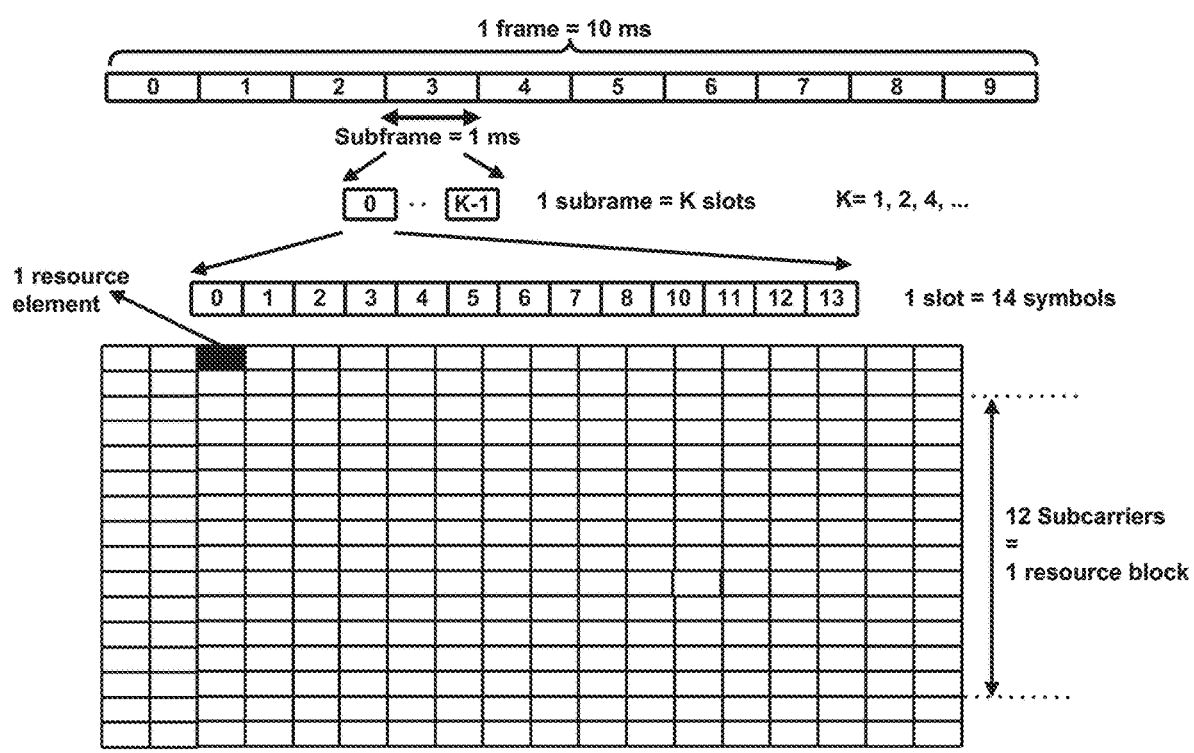
FIG. 7 shows example of frame structure and physical resources according to some aspects of some of various exemplary embodiments of the present disclosure.

FIG. 7 shows example frame structure and physical resources according to some aspects of some of various exemplary embodiments of the present disclosure. The downlink or uplink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 7 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 8:
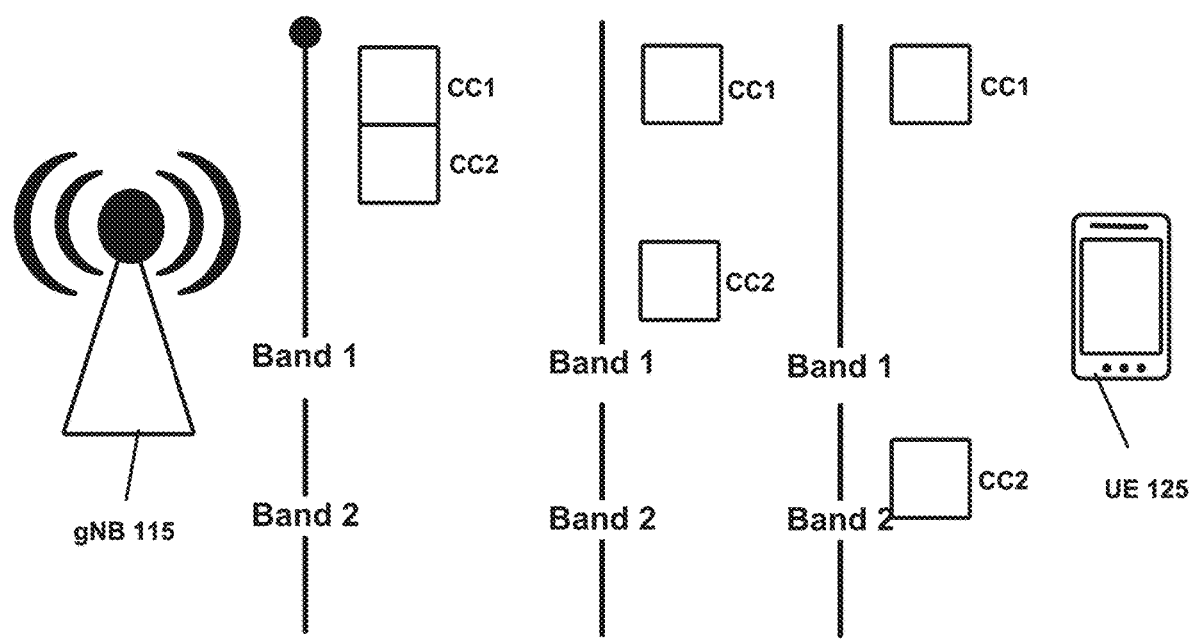
FIG. 8 shows example of component carrier configurations in different carrier aggregation scenarios according to some aspects of some of various exemplary embodiments of the present disclosure.

FIG. 8 shows example component carrier configurations in different carrier aggregation scenarios according to some aspects of some of various exemplary embodiments of the present disclosure. In Carrier Aggregation (CA), two or more Component Carriers (CCs) may be aggregated. A UE 125 may simultaneously receive or transmit on one or multiple CCs depending on its capabilities. CA may be supported for both contiguous and non-contiguous CCs in the same band or on different bands as shown in FIG. 8. A gNB 115 and the UE 125 may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE 125 may adjust the timing of its uplink transmissions using an uplink timing control procedure. A Timing Advance (TA) may be used to adjust the uplink frame timing relative to the downlink frame timing. The gNB 115 may determine the desired Timing Advance setting and provides that to the UE. The UE 125 may use the provided TA to determine its uplink transmit timing relative to the UE's observed downlink receive timing.

In the RRC Connected state, the gNB 115 may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE 125 may use any of the activated SCells of this TAG as a timing reference cell and may not change it unless necessary.

Timing advance updates may be signaled by the gNB 115 to the UE 125 via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE 125 with single timing advance capability for CA may simultaneously receive and/or transmit on multiple CCs corresponding to multiple serving cells sharing the same timing advance (multiple serving cells grouped in one TAG). A UE 125 with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE 125 may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE 125 may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE 125 may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 9:
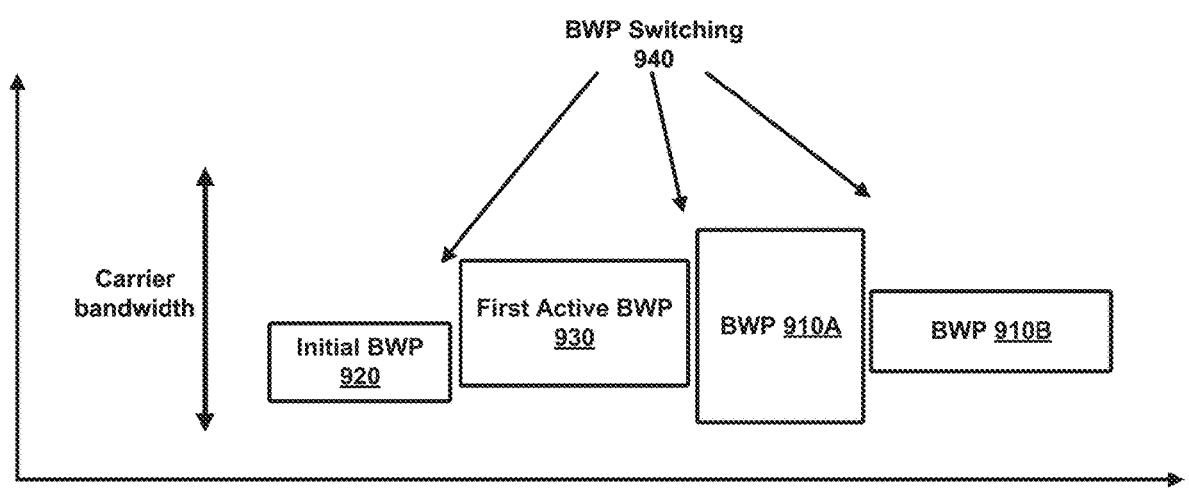
FIG. 9 shows example of bandwidth part configuration and switching according to some aspects of some of various exemplary embodiments of the present disclosure.

FIG. 9 shows example bandwidth part configuration and switching according to some aspects of some of various exemplary embodiments of the present disclosure. The UE (e.g., 125) may be configured with one or more Bandwidth Parts (BWPs) 910 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 920 determined from system information may be used. With Bandwidth Adaptation (BA), for example through BWP switching 940, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 920 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 10:
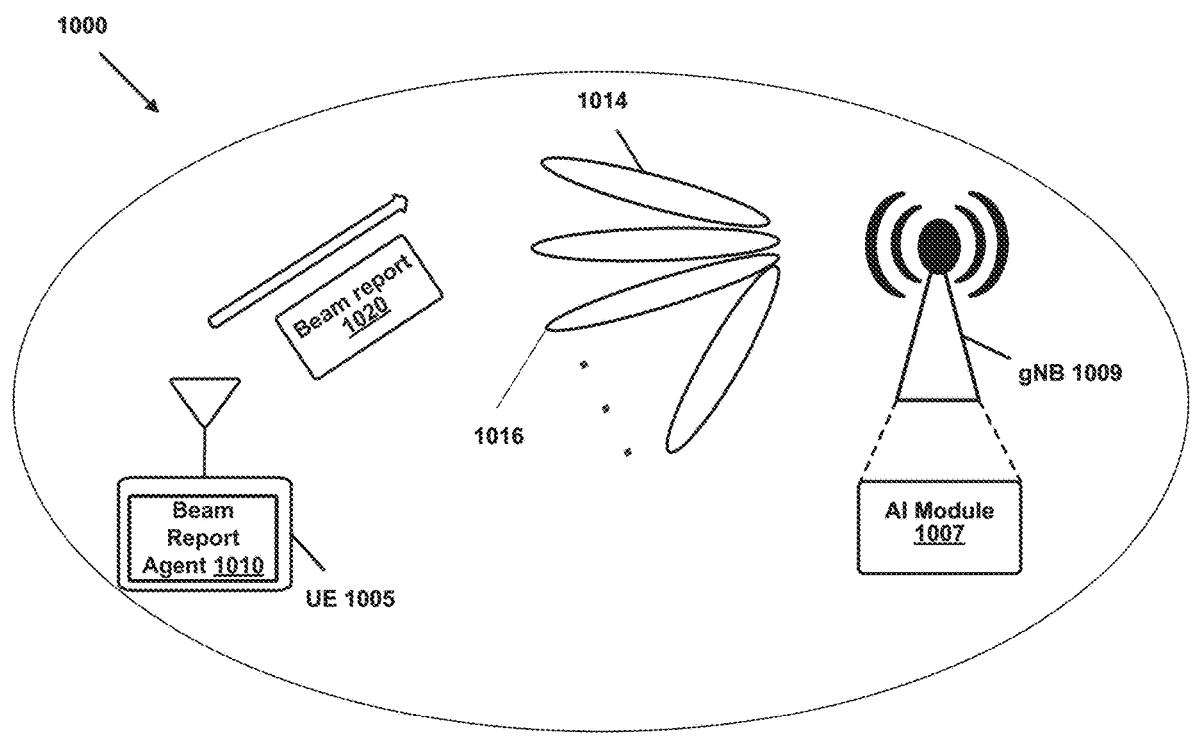
FIG. 10 shows an example of intelligent downlink (DL) beamforming scheme according to some aspects of some of various exemplary embodiments of the present disclosure.

FIG. 10 shows an example of intelligent DL beamforming configuration 1000 according to some aspects of some of various exemplary embodiments of the present disclosure. In the architecture 1000, the gNB 1009 may determine a beam 1016 from the beams 1016 (analog or digital) to transmit DL data or control information. The gNB 1009 may predict the beam direction based on the information received in UL report 1020, and also the historical report information. The beamformed data may be transmitted on PUSCH, and the beamformed control information may be transmitted on PUCCH. As shown, the gNB 1005 may use beamforming scheme to steer the antenna beam 1014 toward the UE 1005, rather than having the signal spread in all directions from its antenna. The gNB 1009 may use antenna array to steer the radiation patters 1016 toward the UE 1005. By steering the beam 1014 in a specific direction (e.g., 1016), beamforming scheme of the configuration 1000, allows the gNB 1009 to deliver higher signal quality to the UE 1005, increases data rate, and lower reduced latency, without needing to increase the transmission power of UE 1005. Additionally, the beamforming scheme can reduce the interference experienced by the other users in the same or adjacent cell.

The Artificial Intelligence (AI) module 1007 may perform an intelligent DL beamforming scheme. The AI module 1007 may use AI techniques to predict the strongest future beam based on the measurements of the past temporal beams. Examples of AI techniques include supervised techniques, classification techniques, Support Vector Machines (SVN), Naive Bayes, K-Means, nearest neighbors, neural networks, Gaussian mixtures, etc.

In some examples, the UE 1005 may transmit a set of training signals to the gNB 1009 to train the AL module 1007. In an initial training step, the AI module 1007 is given a set of training data, and asked to predict the future beam (e.g., beam index from the beam codebook). Once the AI module 1007 is trained, the UE may predict the future beam based on the historical information of the past beams. Using the AI based beamforming techniques, the gNB 1009 may predict the strongest beam that can optimize the performance (e.g., maximizing Signal-to-Interference-plus-Noise-Ratio (SINR)) at the gNB. The UE 1005 may measure the gNB 1009 performance (e.g., throughput, received SNR, ARQ failures or success. latency, etc.), and provides feedback to the gNB 1009. In some examples, the feedback can include a beam report 1020. For example, the beam report 1020 may include L1-RSRP of the best beam or the best M beams. In some other examples, the report may include beam properties such as Direction of Arrival (DOA), Direction of Departure (DOD), beam phase, etc. In some other examples, the UE may use ARQ feedback or power control feedback. The AI module 1007 may perform an AI based technique to predict its feature beam direction (e.g., beam index) based on the beam report from the UE 1005. Further, the gNB 1009 may request the UE 1005 to reduce or increase the beam report frequency according to the measured beam performance from the UE. Additionally, the UE 1005 may transmit training signals frequently (e.g., periodically) to the gNB 1009 according to measured beam performance. In some examples, the training signals may be included in the beam report. The UE 1005 may change the frequency of transmitting training signals to the gNB 1009 according to the beam report. The UE 1005 can use SSB beam transmission during the initial access to train the AI model. Once the AI module 1007 is trained, the gNB may transmit data and control information to the UE 1005 while the UE is moving within the cell.

Figure 11:
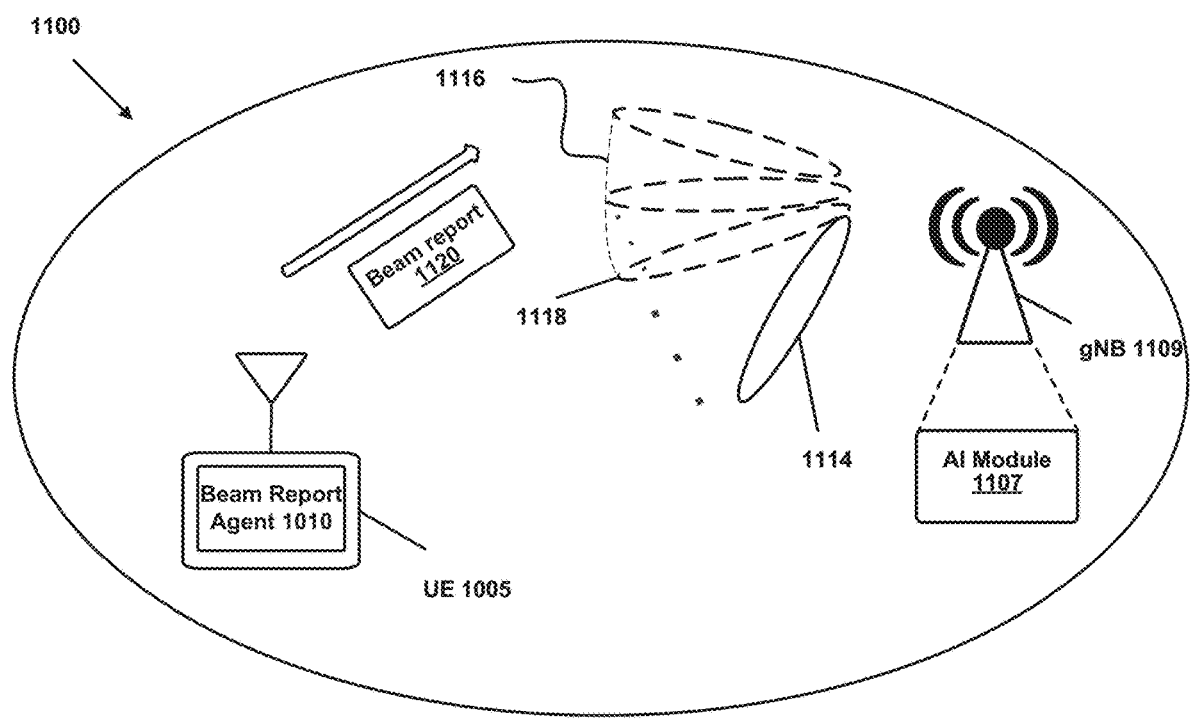
FIG. 11 shows another example of intelligent DL beamforming scheme according to some aspects of some of various exemplary embodiments of the present disclosure.

FIG. 11 shows another example of intelligent DL beamforming configuration 1000 according to some aspects of some of various exemplary embodiments of the present disclosure. In the architecture 1100, the gNB 1109 may determine a subset of beams 1116 from the beams 1114 (analog or digital) to transmit DL data or control information. The gNB 1109 may determine the subset of beams 1116 based on the information in the beam report 1120 received from the UE, and also its historical report information and/or its own measurement of UL signals. The gNB 1109 may determine a beam direction (e.g., beam 1118) from the subset of beams 1114 to transmit data or control information towards the UE 1005. The beamformed data may be transmitted on PUSCH, and the beamformed control information may be transmitted on PUCCH. As shown, the gNB 1109 may use beamforming scheme to steer the antenna beam 1114 toward the UE 1005, rather than having the signal spread in all directions from its antenna. The gNB 1109 may use antenna array to steer the radiation patters 1116 toward the UE 1005. By steering the beam 1114 in a specific direction (e.g., 1118), beamforming scheme of the configuration 1100, allows the gNB 1109 to deliver higher signal quality to the UE 1005, increases data rate, and lower reduced latency, without needing to increase the transmission power of UE 1005. Additionally, the beamforming scheme can reduce the interference experienced by the other users in the same or adjacent cell. Using the subset of beam 1116 can significantly reduce the computational complexity of the beamforming.

The Artificial Intelligence (AI) module 1107 may perform an intelligent DL beamforming scheme. The AI module 1107 may use AI techniques to predict the strongest future beam based on the measurements of the past temporal beams. Examples of AI techniques include supervised techniques, classification techniques, Support Vector Machines (SVN), Naive Bayes, K-Means, nearest neighbors, neural networks, Gaussian mixtures, etc.

In some examples, the UE 1005 may transmit a set of training signals to the gNB 1009 to train the AL module 1007. In an initial training step, the AI module 1107 is given a set of training data, and asked to determine the subset of beams 118, and predict the future beam (e.g., beam index). Once the AL module 1107 is trained, the UE may predict the future beam based on the historical information of the past beams. Using the AI based beamforming techniques, the gNB 1109 may predict the strongest beam that can optimize the performance (e.g., maximizing Signal-to-Interference-plus-Noise-Ratio (SINR)) at the gNB. The UE 1005 may measure the gNB 1109 performance (e.g., throughput, received SNR, ARQ failures or success. latency, etc.), and provides feedback to the gNB 1109. In some examples, the feedback can include a beam report 1120. For example, the beam report 1120 may include L1-RSRP of the best beam or the best M beams. In some other examples, the report may include beam properties such as Direction of Arrival (DOA), Direction of Departure (DOD), beam phase, etc. In some other examples, the UE may use ARQ feedback or power control feedback. The AI module 1107 may perform an AI based technique to predict its feature beam direction (e.g., beam index) based on the beam report from the UE 1005. Further, the gNB 1109 may request the UE 1005 to reduce or increase the beam report frequency according to the measured beam performance from the UE. Additionally, the UE 1005 may transmit training signals frequently (e.g., periodically) to the gNB 1109 according to measured beam performance. In some examples, the training signals may be included in the beam report. The UE 1005 may change the frequency of transmitting training signals to the gNB 1109 according to the beam report. The UE 1005 can use SSB beam transmission during the initial access to train the AI model. Once the AI module 1107 is trained, the gNB may transmit data and control information to the UE 1005 while the UE is moving within the cell.

Figure 12:
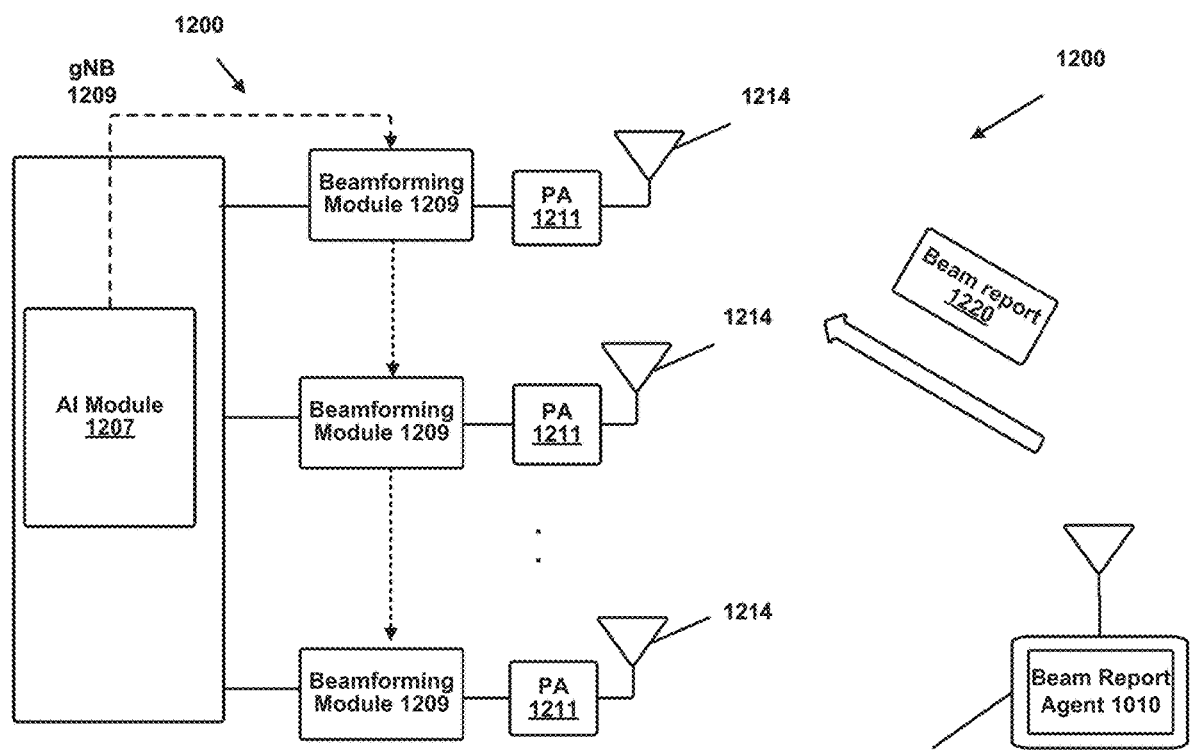
FIG. 12 shows example of intelligent DL beamforming block diagram according to some aspects of some of various exemplary embodiments of the present disclosure.

FIG. 12 shows example of intelligent DL beamforming block diagram according to some aspects of some of various exemplary embodiments of the present disclosure. The gNB 1207 (e.g., gNB 1009, 11009) includes an antenna array consisting of m transmit antennas 1214. In the configuration 1200, the beamforming modules 1209 beamforms the transmitted signals by applying the correct phase and amplitude to the transmitted data. The AI module 1207 (e.g., AI module 1007, 1107) may determine the beamforming parameters (e.g., phase and amplitude), and beamforms the transmitted signal at the antennas 1214 by applying the parameter determined by the AI module 1207 to the transmitted signal. In an embodiment, the modules 1209 may perform a multiplication operation, and multiply the transmitted signals by a beamforming vector $$W^T = [w_1, w_2, w_3, w_4], \|W\| = 1 \quad (1)$$

The AI module 1207 computes the beamforming vector W based on the received training signals from the gNB 1209. The beamforming vector W is computed such that the received signals from the antennas 1214 are coherently added at the received antennas at the UE 1005. In some embodiments, the AI module 1207 may estimate the beamforming vector W at the beginning of each time frame, and use it for entire time frame length. In some other embodiments, the beamforming module 1207 may update the beamforming vector W according to wireless propagation channel variations dynamically during the time frame length. The Power Amplifier (PA) 1211 converts low power radio frequency signals (RF) into a higher power signal to drive the antennas 1214.

In an initial training step, the AI module 1207 is given a set of training data, and asked to predict the future beam (e.g., beam index). Once the AI module 1207 is trained, the UE may predict the future beam based on the historical information of the past beams. Using the AI based beamforming techniques, the gNB may predict the strongest beam that can optimize the performance (e.g., maximizing the SNR) at the UE. The UE may measure the gNB beam performance (e.g., throughput, received SNR, ARQ failures or success. latency, etc.), and provides a beam report 1220 (e.g., beam report 1020, 1120) to the gNB. For example, the beam report 1220 may include L1-RSRP of the best beam or the best M beams. In some other examples, the report may include beam properties such as Direction of Arrival (DOA), Direction of Departure (DOD), beam phase, etc. In some other examples, the UE may use ARQ feedback or power control feedback. The AI module 1207 may perform an AI based techniques to predict its feature beam direction (beam index) based on the beam report from the UE. Further, the UE may reduce or increase the beam report frequency according to requests or recommendations from the gNB. Additionally, the UE may transmit training signals frequently (e.g., periodically) to the gNB according to measured beam performance. In some examples, the training signals may be included in the beam report. The gNB may request to change the frequency of transmitting training signals to the gNB according to the beam report. Once the AL module 1207 is trained, the gNB may transmit data or control information to the UE via while the UE is moving within the cell.

Figure 13:
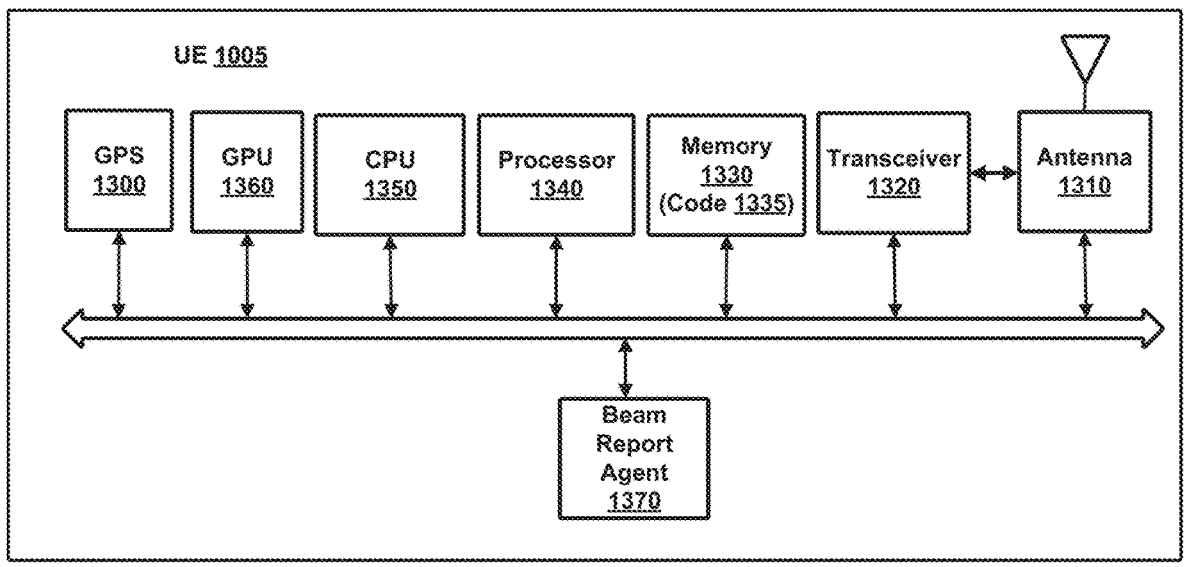
FIG. 13 shows example components of a user equipment (UE) for transmission and/or reception according to some aspects of some of various exemplary embodiments of the present disclosure.

FIG. 13 shows example components of a user equipment 1005 for transmission and/or reception according to some aspects of some of various exemplary embodiments of the present disclosure. All or a subset of blocks and functions in FIG. 13 may be in the user equipment 1005 and may be performed by the user equipment 1005. The antenna 1310 may be used for transmission or reception of electromagnetic signals. The Antenna 1310 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration.

In some embodiments, the Antenna 1310 may enable a massive MIMO configuration with tens or hundreds of antenna elements. The antenna 1310 may enable other multi-antenna techniques such as beamforming. In some examples and depending on the UE 1005 capabilities (e.g., a low-complexity UE), the UE 1005 may support a single antenna only.

The transceiver 1320 may communicate bi-directionally, via the antenna 1310, wireless links as described herein. For example, the transceiver 1320 may represent a wireless transceiver at the UE and may communicate bi-directionally with the wireless transceiver at the base station or vice versa. The transceiver 1320 may include a modem to modulate the packets and provide the modulated packets to the antennas 1310 for transmission, and to demodulate packets received from the Antennas 1310.

The memory 1330 may include RAM and ROM. The memory 1330 may store computer-readable, computer-executable code 1435 including instructions that, when executed, cause the processor to perform various functions described herein. In some examples, the memory 1330 may contain, among other things, a Basic Input/output System (BIOS) which may control basic hardware or software operation such as the interaction with peripheral components or devices.

The processor 1340 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory using a memory controller. In other examples, a memory controller may be integrated into the processor 1340. The processor 1340 may be configured to execute computer-readable instructions stored in a memory (e.g., the memory 1330) to cause the UE 1005 to perform various functions.

The Central Processing Unit (CPU) 1350 may perform basic arithmetic, logic, controlling, and Input/output (I/O) operations specified by the computer instructions in the Memory 1330. The user equipment 1005 may include additional peripheral components such as a graphics processing unit (GPU) 1360 and a Global Positioning System (GPS) 1370. The GPU 1360 is a specialized circuitry for rapid manipulation and altering of the Memory 1330 for accelerating the processing performance of the user equipment 1005. The GPS 1370 may be used for enabling location-based services or other services for example based on geographical position of the user equipment 1005.

The beam report agent 1370 may be implemented via hardware, software, or combination thereof. For instance, the beam report agent 1370 may be implemented as instruction codes 1335, stored in the memory 1230, and executed by the processor 1340, or as a circuit. The beam report agent 1370 may be used to perform various aspects and functionality related to present disclosure. Additionally, beam report agent 1370, may measure the DL beamforming parameters and prepare a report (e.g., beam report 1020, 1120) to be transmitted to the gNB as described previously.

In addition, the beamforming assistant module 1360 may provide beam a report to the gNB via a dedicated channel to help to the gNB to adapt its beam (e.g., phase and amplitude) according to the provided network assistant information. The network assistant information may include Angle of Arrival, Angle of Departure, SNR, beamforming phase, beam forming amplitude, measured throughput, latency, etc. In some examples, the network assistant information may be transmitted to the gN via UCI.

Figure 14:
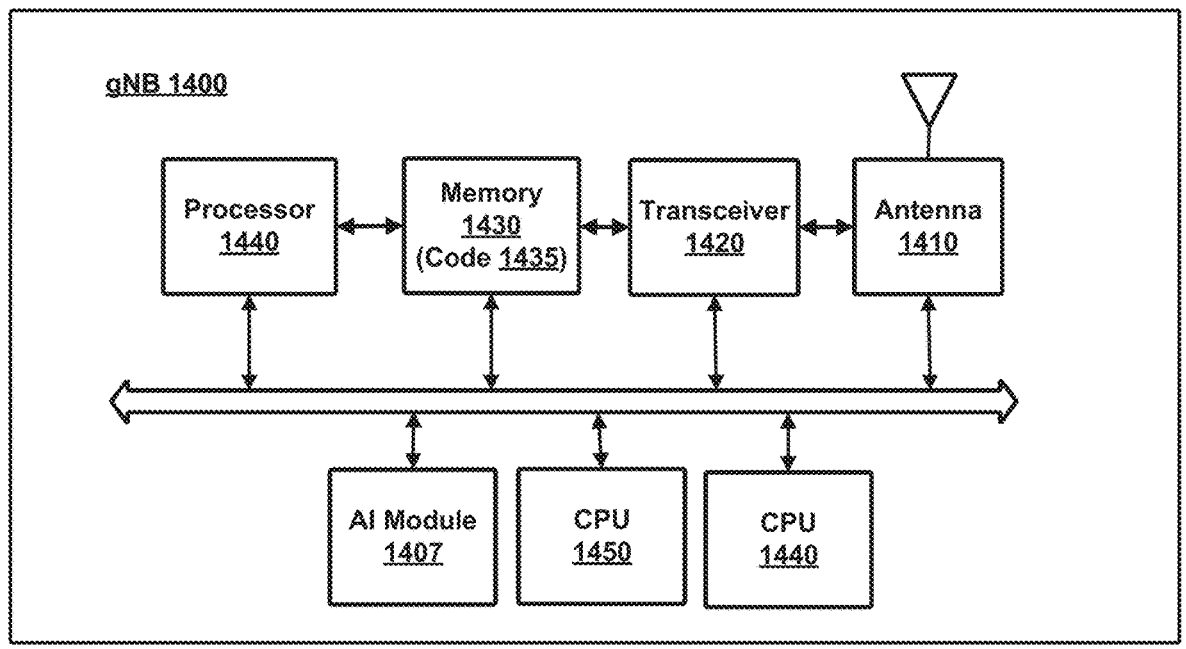
FIG. 14 shows example components of a base station (BS) for transmission and/or reception according to some aspects of some of various exemplary embodiments of the present disclosure.

FIG. 14 shows example components of a gNB 1400 (e.g., gNB 1009, 1109) for transmission and/or reception according to some aspects of some of various exemplary embodiments of the present disclosure. All or a subset of blocks and functions in FIG. 14 may be in the gNB 1400 may be performed by the gNB 1400. The antennas 1410 may be used for transmission or reception of electromagnetic signals. The antennas 1410 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antennas 1410 may enable a massive MIMO configuration with tens or hundreds of antenna elements. The antennas 1410 may enable other multi-antenna techniques such as beamforming. In some examples and depending on the gNB 1400 capabilities, the gNB 1400 may support a single antenna only.

The transceiver 1420 may communicate bi-directionally, via the antenna 1410, wireless links as described herein. For example, the transceiver 1420 may represent a wireless transceiver at the UE and may communicate bi-directionally with the wireless transceiver at the base station or vice versa. The transceiver 1420 may include a modem to modulate the packets and provide the modulated packets to the antennas 1410 for transmission, and to demodulate packets received from the antennas 1410.

The memory 1430 may include RAM and ROM. The memory 1430 may store computer-readable, computer-executable code 1435 including instructions that, when executed, cause the processor to perform various functions described herein. In some examples, the memory 1430 may contain, among other things, a Basic Input/output System (BIOS) which may control basic hardware or software operation such as the interaction with peripheral components or devices.

The processor 1440 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory using a memory controller. In other examples, a memory controller may be integrated into the processor 1440. The processor 1440 may be configured to execute computer-readable instructions stored in a memory (e.g., the memory 1430) to cause the gNB 1400 to perform various functions.

The Central Processing Unit (CPU) 1450 may perform basic arithmetic, logic, controlling, and Input/output (I/O) operations specified by the computer instructions in the Memory 1430.

The AI module 1407 performs intelligent DL beamforming as described previously. The AI model 1407 may use an AI model (e.g., supervised learning, unsupervised learning, K-means, classification algorithms, Naive-Bayes, Support Vector Machine (SVM), etc.). The AI module 1407 may use training signals from the UE to train its prediction model to determine the future UL beam for the data transmission. For instance, the AI module 1407 is configured to perform beamforming functions including beam prediction, beamforming vector computation and adaptation, and reporting beamforming information to the gNB. In some examples, the AI module 1407 may perform a set of physical layer/medium access control procedures to acquire and maintain a set of beam pair links e.g., a beam used at transmit-receive point(s) (TRP(s)) for BS side paired with a beam used at UE. The beam pair links may be used for downlink and uplink transmission/reception. The beam management procedures may include one or more of beam vector computation and adaptation, receiving beamforming and power control command, a beam sweeping process, a beam measurement process, a beam reporting process, a beam determination process, a beam maintenance process, and a beam recovery process. For example, beamforming vector may be computed at the beginning of a time frame for a low varying wireless channel, while it may be tracked during a time frame for a fast varying wireless channel. The Beam sweeping process may be used for covering a spatial area, with beams transmitted and/or received during a time interval in a predetermined way. The beam measurement process may be used by the TRP(s) or UE to measure characteristics of received beamformed (BF) signals. The beam reporting process may be used by the UE to report information of BF signal(s) based on beam measurement. The beam determination process may be used by the TRP(s) or UE to select the Tx/Rx beam(s). The beam maintenance process may be used by the TRP(s) or UE to maintain the candidate beams by beam tracking or refinement to adapt to the channel changes due to UE movement or blockage. The beam recovery process may be used by the UE to identify new candidate beam(s) after detecting beam failure and subsequently indicate the TRP of beam recovery request with information of indicating the new candidate beam(s).

In some examples, beam management may be performed in UL and/or DL directions. When good channel reciprocity is available (e.g. in time division duplex (TDD) systems), beam management of one direction may be based on another direction, e.g. UL beam management may perform well based on the results of DL beam management. In some examples, beam correspondence may be used based on uplink-downlink reciprocity of beamformed channel, for example UL Tx/Rx beam(s) may be determined based on beam measurement of DL beamformed reference signals (RSs).

In some examples, group-based beam management may be used to manage beams in group basis instead of beam-by-beam basis, for example, considering that beams sharing similar channel properties may be put into the same beam group. The beam management procedure may include beam sweeping, beam measurement, beam reporting (e.g., group-ing based beam reporting), beam determination, beam maintenance (e.g., group-based beam maintenance) and beam failure recovery.

Further, the AI module 1407 may determine to activate AI based DL beamforming based on a metric. The gNB may measure the beam prediction accuracy, and determine to activate the AI based model or not. For example, the gNB may compute the prediction error based on training signals transmitted in DL, and if the prediction accuracy is below a threshold activate the AL beamforming technique.

Figure 15:
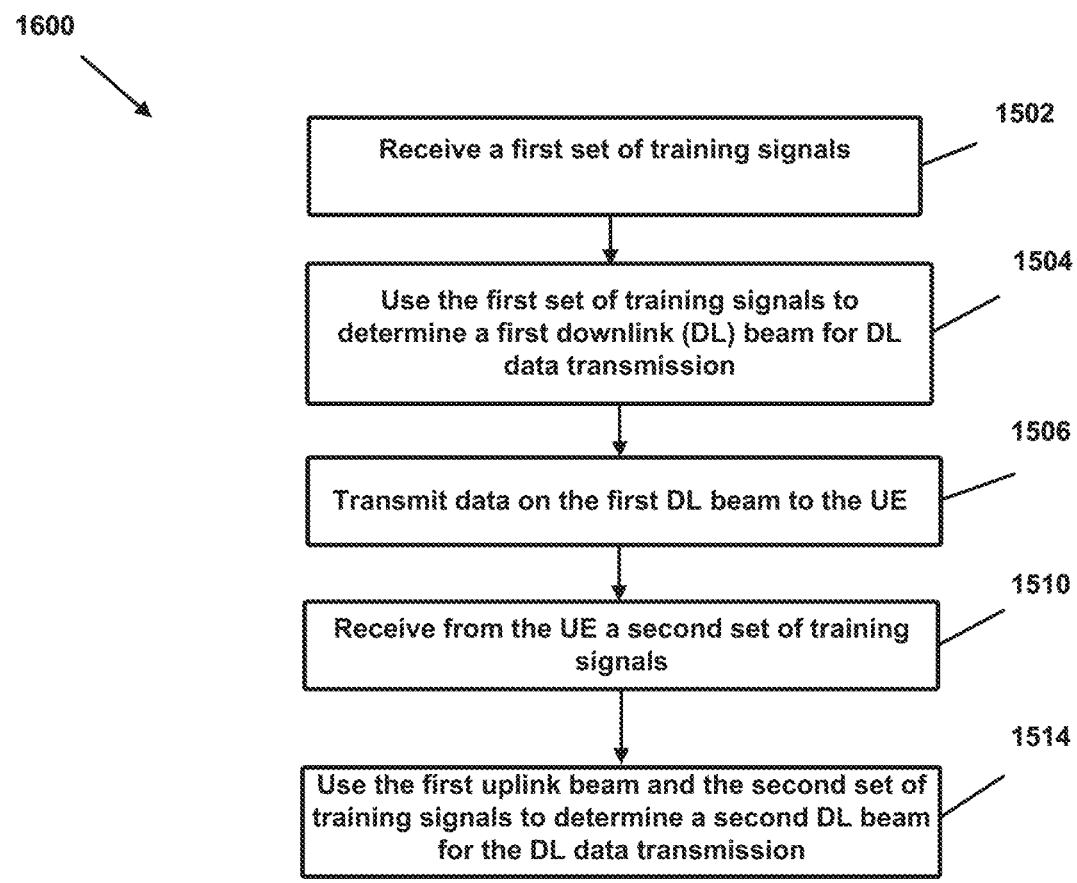
FIG. 15 shows a flow diagram of a BS performing intelligent UL beamforming method according to some aspects of some of various exemplary embodiments of the present disclosure.

FIG. 15 shows a flow diagram of a gNB performing an example of intelligent DL beamforming method according to some aspects of some of various exemplary embodiments of the present disclosure.

At step 1502, the gNB receives from a UE, a first set of training signals. The first set of the training signals are used to train the AI module. Once the AI module is trained, it will update the DL beam automatically according to propagation environment. In some embodiments, the first set of raining signals may include SRS, PTS, and/DMRS.

At step 1504, the UE use the first set of training signals to determine a first DL beam for DL data transmission. The DL beam is identified by beam parameters such as beam phase, beam amplitude, etc. The beam module will determine the beam parameters, and a beam (analog, or from a codebook) for DL transmission.

At step 1506, the gNB transmit data on the determined DL beam by step 1504.

At step 1510, the gNB receives a second set of training signals from the UE. The first set of the training signals are used to train the AI module.

At step 1514, the gNB uses the first uplink beam and the second set of training signals to determine a second DL beam for the DL data transmission. In some embodiments, the UE may transmit a report in addition to the second set of training signals. The report may include the UE measurement of the first DL beam parameters.

In some embodiments, initially, a gNB may transmit narrow beams in all predefined directions in a burst in a regular interval in the beam sweeping process. For example, the first step in the mobile terminal attach procedure is initial Access, which is to synchronize with the system and receive the minimum system information broadcast. So, an "SS Block" carries the PSS, the SSS, and the PBCH, and it will be repeated in predefined directions (beams) in the time domain in 5 ms window, this is called a SS burst, and this SS burst will be repeated in 20 ms periodicity typically. The UE searches for the best beam periodically using the pre-defined threshold criteria defined by the gNB, and identifies the beam that has highest reference signal received power (RSRP). The best beam identified by the UE is informed to the BS; this is called beam reporting. Once the gNB receives the beam report, it may use the information in the report to train its AL model, and determine the future beam.

Figure 16:
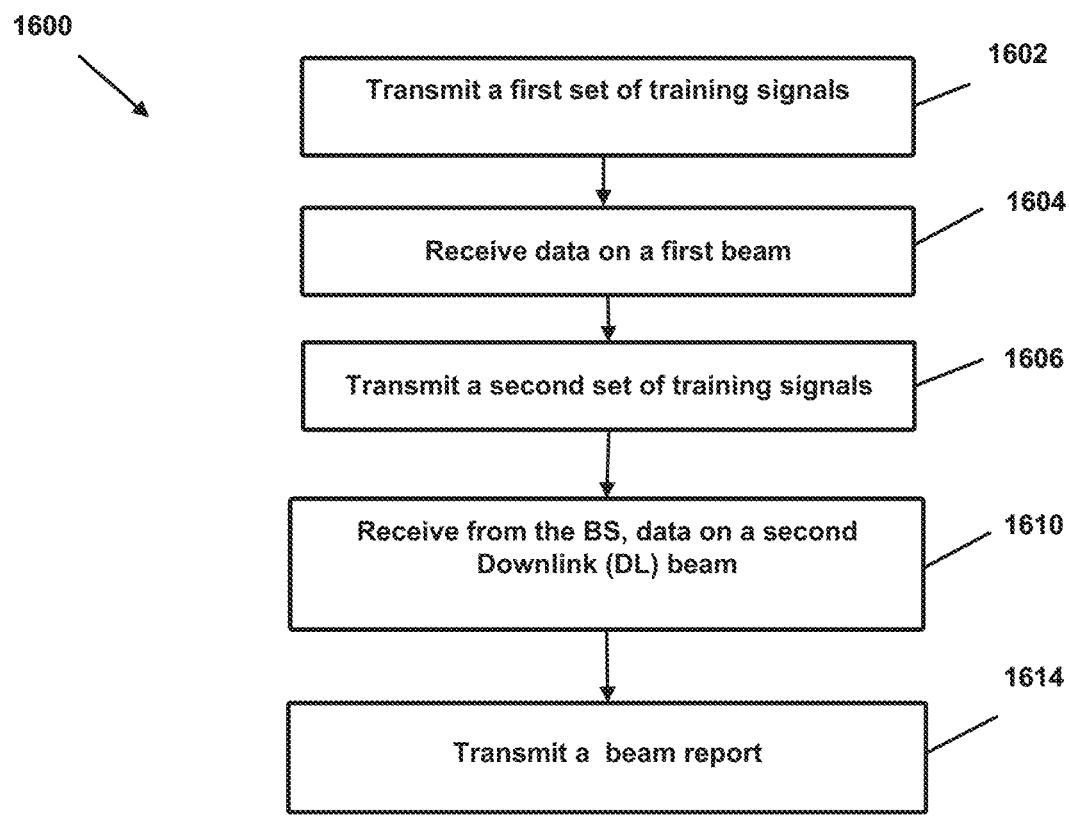
FIG. 16 shows flow diagram of a UE performing intelligent DL beamforming support and DL beam measurement method according to some aspects of some of various exemplary embodiments of the present disclosure.

FIG. 16 shows a flow diagram UE performing intelligent DL beamforming support and DL beam measurement method according to some aspects of some of various exemplary embodiments of the present disclosure.

At step 1602, the UE transmits to the gNB, a first set of training signals. The first set of the training signals are used to train the gNB AI module. In some embodiments, the first set of raining signals may include SRS, PTS, and/DMRS.

At step 1606, the UE receives data on a first beam from the gNB. In some embodiment, the UE may measure the first beam parameters, and prepare a report including the measurements.

At the step 1606, the UE transmits to the gNB, a second set of training signals. The second set of the training signals are used to train the gNB AI module. In some embodiments, the second set of raining signals may include SRS, PTS, and/DMRS. In some embodiment, the UE may transmit the report in addition to the second set of training signals to the gNB.

At step 1610, the UE receives data on a second DL beam from the gNB.

At step 1614, the UE measure the second beam parameters, and transmit a report including the beam measurement result to the gNB.

Figure 17:
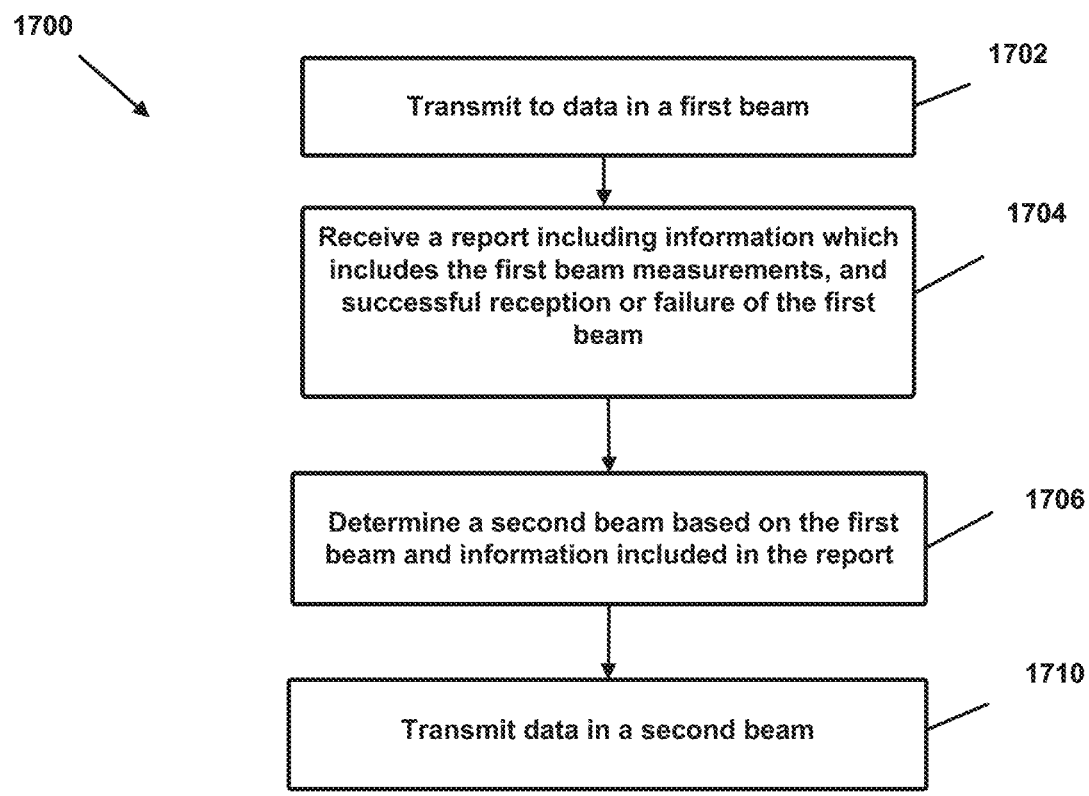
FIG. 17 shows flow diagram of a method of intelligent DL beam recovery process at a BS according to some aspects of some of various exemplary embodiments of the present disclosure.

FIG. 17 shows flow diagram of a method of intelligent DL beam recovery process at a BS according to some aspects of some of various exemplary embodiments of the present disclosure.

At step 1702, the gNB transmits data in a first beam to the UE. The first beam may include the initial synchronization data or connected mode data.

At step 1704, the gNB receives a report including information which includes the first beam measurements, and successful reception or failure of the first beam. The UE monitors the reference signals (e.g., DMRS) and identifies the beam failure once the failure trigger conditions are met.

At step 1706, the gNB determines a second beam based on the first beam and information included in the report. In the case of beam failure due to poor channel condition, the beam recovery process is triggered to determine the second beam. The gNB may use an AI model to proactively predict a second beam and switch the downlink beam to a secondary beam when a trigger occurs.

Once the second beam is determined, the gNB transmits data on the second beam.

In some embodiments, this method can be used for initial access process. In some examples, the gNB may actively search for a second beam. The second beam determination process can be similar to the first beam determination process. However, the AI model need to predict a second beam in addition to the first beam so as to switch from the first beam to the second beam in the case of the first beam failure. The second beam can be determined to be the second-best beam that matches the cannel between the gNB and the UE. Also, no additional training is required to train the AI model to predict the second beam. In some examples, the gNB may measure the channel conditions between the UE and the gNB, and the AL model may determine to switch to the second beam if the channel quality is poor.

When the UE is in connected mode, the AI model can be used in the beam switching process. Switching from one beam to another beam can also be called intra-cell mobility or beam-level mobility. The beam switching is based on a trigger condition for a beam and the configured beam switching algorithm. Accordingly, the AL model can proactively search for a secondary beam to switch the downlink beam if a trigger condition occurs. Similar to the initial access, the AI model need to predict a second beam in addition to the first beam so as to switch from the first beam to the second beam. The second beam can be determined to be the second-best beam that matches the cannel between the gNB and the UE. No additional training is required to train the AI model to predict the second beam. In some examples, the gNB may measure the channel conditions between the UE and the gNB, and the AI model may determine to switch to the second beam if the channel quality is poor.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

What is claimed is:

1. A method of data transmission, comprising the steps of:
   receiving, by a base station (BS), from a user equipment (UE), a first set of training signals;
   using the first set of training signals to determine a first downlink (DL) beam for DL data transmission;
   transmitting data on the first DL beam to the UE;
   receiving, by the UE, a second set of training signals;
   using the first uplink beam and the second set of training signals to determine a second DL beam for the uplink data transmission; and
   transmitting data on the second DL beam to the UE.

2. The method of claim 1, further comprising receiving a beam report from the user equipment (UE).

3. The method of claim 1, further comprising:
   transmitting downlink (DL) training signals in a plurality of DL beams, wherein each DL beam has a different direction.

4. The method of claim 3, further comprising receiving a beam report from the user equipment (UE), wherein the beam report indicates the strongest downlink (DL) beam.

5. The method of claim 4, wherein the beam report includes a layer 1 of the reference signal received power (L1-RSRP) of a beam in the plurality of downlink (DL) beams that has the strongest L1-RSRP.

6. The method of claim 2, wherein the beam report includes one or more of the following:
   a direction of arrival (DOA) of the first downlink (DL) beam or the second DL beam;
   a direction of departure (DOD) of the first DL beam or the second DL beam;
   a phase of the first DL beam or the second DL beam; and
   an amplitude of the first DL beam or the second DL beam.

7. The method of claim 1, wherein the first set of training signals and the second set of training signals include one or more of the following:
   a transmit power control (TPC) signal;
   an automatic repeat request (ARQ) signal;
   a phase information signal; and
   an amplitude information signal.

8. The method of claim 3, further comprising:
   transmitting downlink (DL) training signals in a subset of the plurality of DL beams.

9. A method of data transmission, comprising the steps of:
   transmitting, by a user equipment (UE), to a base station (BS), a first set of training signals;
   receiving, from the BS, data on a first downlink (DL) beam;
   transmitting, to the BS, a first beam report;
   transmitting, by the user equipment (UE), to the BS, a second set of training signals; and
   receiving, from the BS, data on a second DL beam;
   transmitting, to the BS, a second beam report,
   wherein:
   the first downlink (DL) beam or the second DL beam are determined based on an artificial intelligence (AI) model; and
   the first set of training signals, and the second set of training signals are used to train the AI model such that the AI model predicts a direction of the first DL beam or the second DL beam.

10. A method of beam recovery, comprising the steps of:
    transmitting, to a user equipment (UE), data in a first beam;
    receiving a report, from the UE, including information which includes the first beam measurements, and successful reception or failure of the first beam;
    in response to receiving the report, determining a second beam based on the first beam and information included in the report; and
    transmitting, to the UE, data in a second beam,
    wherein:
    determining the first downlink (DL) beam includes computing parameters of the first uplink beam that maximize signal-to-interference-plus-noise ratio (SINR) of the first DL beam at the UE;
    determining the second DL beam includes computing parameters of the second DL beam that maximize signal-to-interference-plus-noise ratio (SINR) of the second DL beam at the base station (BS);
    the parameters of the first downlink (DL) beam and the parameters of the second DL beam include one or more of the following:
    a direction of arrival (DOA);
    a direction of departure (DOD);
    a beam phase; and
    a beam amplitude.

11. The method of claim 10, wherein:
    the second beam is determined based on the information included in the report by an artificial intelligence (AI) model.

12. The method of claim 11, wherein the successful reception or failure of the first beam is used to train the artificial intelligence (AI) model.

13. The method of claim 10, wherein the beam recovery process is used when the user equipment (UE) is in an idle mode.

14. The method of claim 10, wherein the beam recovery process is used when the user equipment (UE) is in a connected mode.

15. The method of claim 10, further comprising:
    measuring the received signal, from the user equipment (UE), at the base station (BS);

determining the quality of the channel between the UE and the BS, based on the measurement of the received signal; and whether the channel quality is below a threshold, determine the second beam, and switch the data transmission from the first beam to the second beam.

16. The method of claim 10, further include:

an artificial intelligence (AI) model wherein:

the AI model actively determines the second beam, whether the report indicates successful reception or failure of the first beam.

17. A base station (BS), the base station comprising:

a transceiver configured to:

transmit, to a user equipment (UE), a first set of training signals;

transmit data on a first beam to the UE;

receive, from the UE, a second set of training signals; and transmit data on a second beam to the UE; and and a processor in communication with transceiver, the processor configured to:

use the first set of training signals to determine the first beam for downlink DL) data transmission; and use the first DL beam and the second set of training signals to determine a second DL beam for the DL data transmission, wherein:

determining the first downlink (DL) beam includes computing parameters of the first uplink beam that maximize signal-to-interference-plus-noise ratio (SINR) of the first DL beam at the UE; and determining the second DL beam includes computing parameters of the second DL beam that maximize signal-to-interference-plus-noise ratio (SINR) of the second DL beam at the base station (BS).

18. The method of claim 17, wherein the parameters of the first downlink (DL) beam and the parameters of the second DL beam include one or more of the following:

a direction of arrival (DOA);

a direction of departure (DOD);

a beam phase; and a beam amplitude.

* * * * *